3,462,282
PROCESS AND APPARATUS FOR PREPARING A SMOKING FLUID AND SMOKING FOODSTUFFS THEREWITH
Gerhard Fessmann, Mozartstrasse 16, 7012 Fellbach, near Stuttgart, Germany
Filed Dec. 20, 1965, Ser. No. 515,126
Claims priority, application Germany, Dec. 23, 1964, F 44,795; Feb. 18, 1965, F 45,276; June 16, 1965, F 46,346; Apr. 6, 1965, F 45,739; Dec. 10, 1965, F 47,888
Int. Cl. A23b 1/04
U.S. Cl. 99—229                     46 Claims

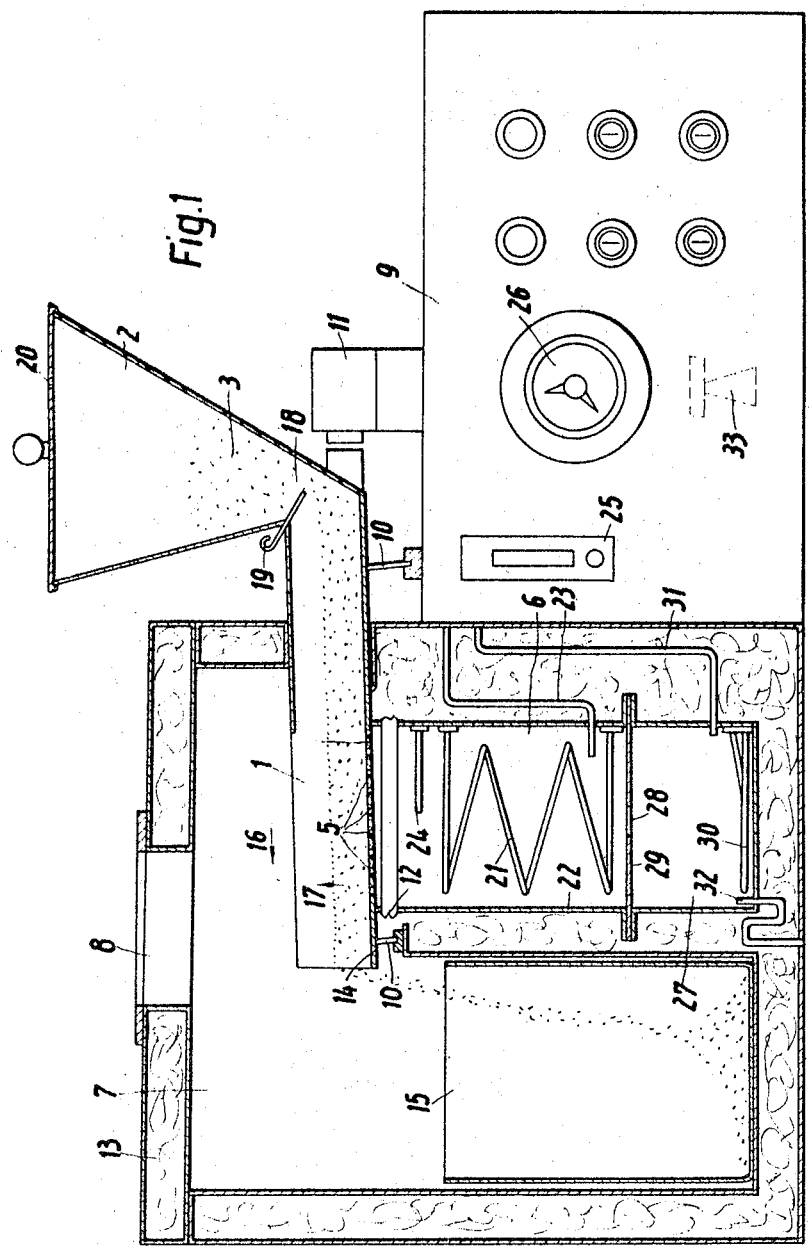

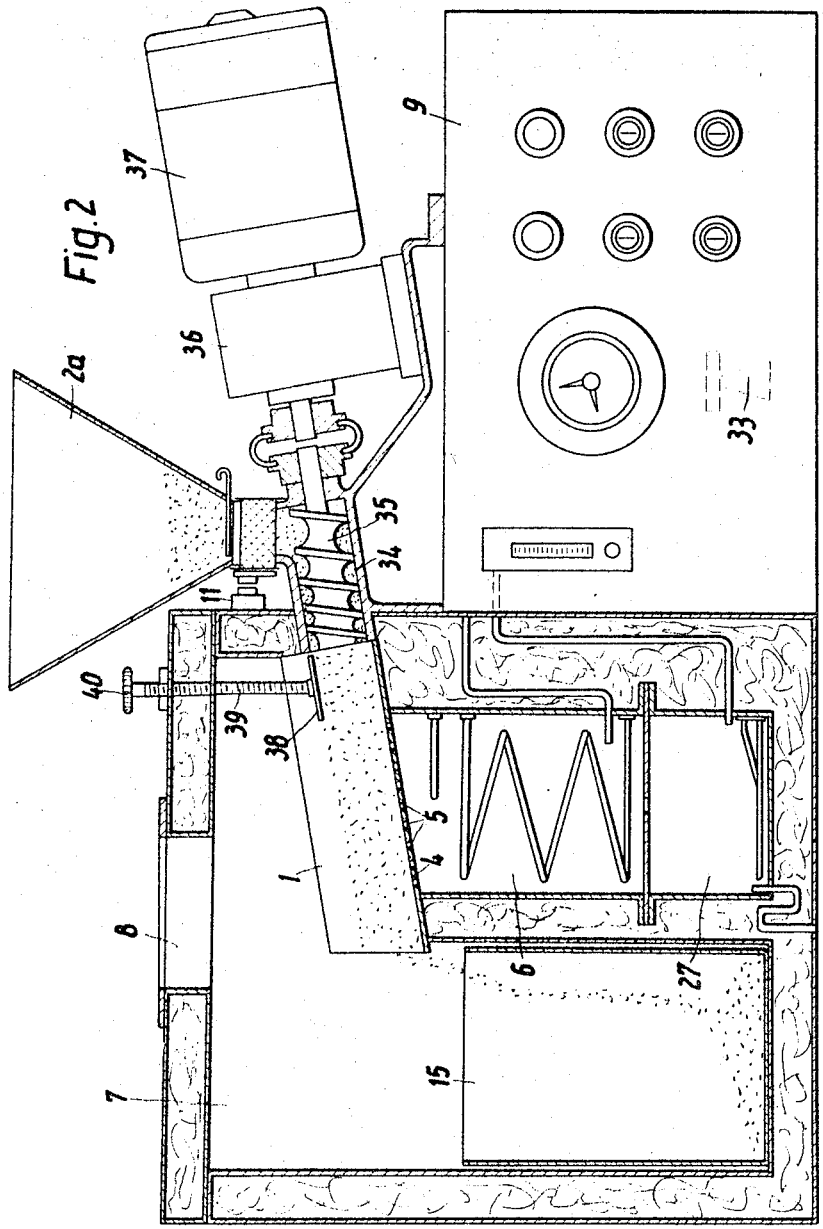

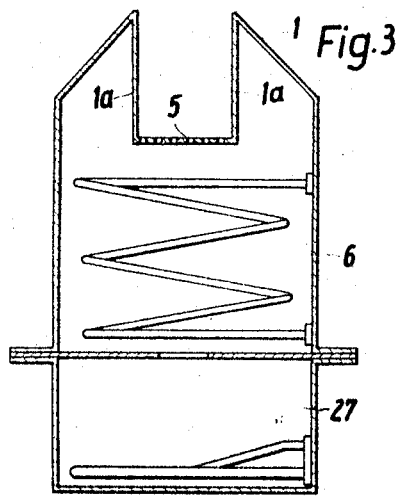
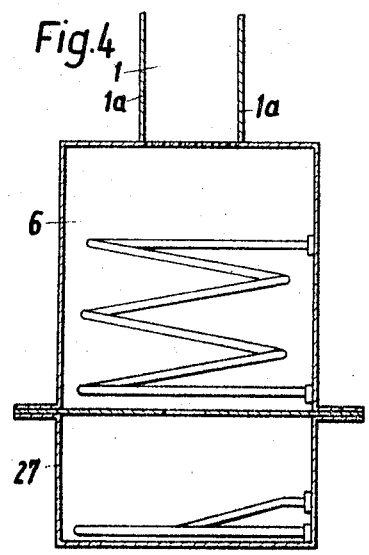
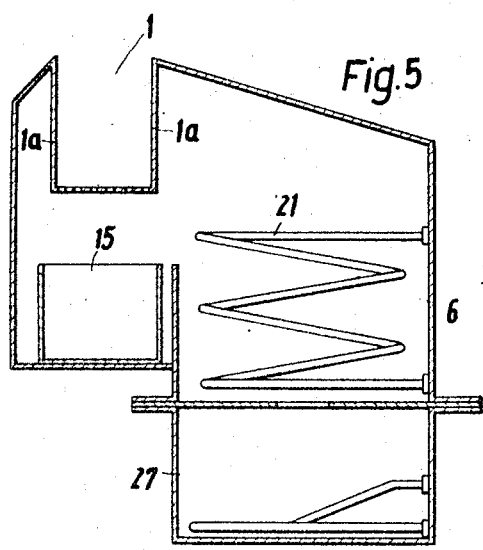
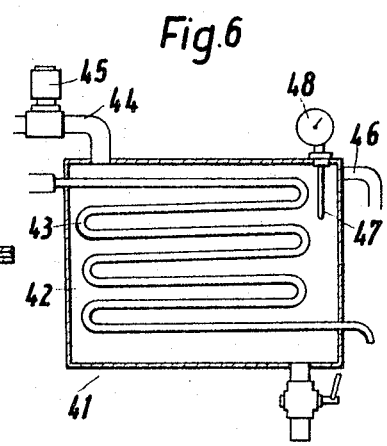

ABSTRACT OF THE DISCLOSURE

A process and apparatus for treating foodstuffs which includes a contacting finely divided wood chips or sawdust with superheated steam to effect thermal decomposition of at least a portion thereof and thereby create a smoking fluid. The smoking fluid is then brought into contact with the foodstuffs to be treated and imparts a smoke flavoring thereto in conjunction with the simultaneous cooking thereof when so desired.

---

Figure 7:
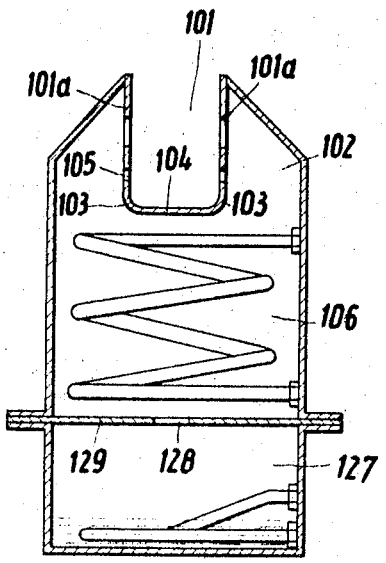

This invention relates to a process of preparing and utilisation of a fluid for smoking foodstuffs, such as meat, sausage, fish, ham, cheese, and the like, which are to be subjected to the action of the smoking fluid produced with the aid of sawdust. This process serves to impart to foodstuffs a smoked flavor, which is the same as or similar to the flavor which is produced by smoking these foodstuffs with wood smoke.

It is known to use as a smoking fluid a liquid, which is obtained by introducing wood smoke into water. This has the disadvantage that saw chips or saw dust must be burnt, just as when the foodstuffs are directly treated with wood smoke. Such burning requires fireproof containers. The combustion process, particularly the combustion temperature, and the composition of the smoking fluid, which depends on said temperature, can be controlled only with difficulty. Soot and other tar-containing substances tend to deposit on the walls of the container and may give rise to undesired secondary combustion processes.

In another known process, wood is heated to produce wood gas, which is then condensed and subjected to fractional distillation. The resulting distillate is diluted with water. This process is so complicated that the production of the smoking fluid is expensive, and the process requires a combustion, which has the above-mentioned disadvantages.

In the known smoke gas process there must be a flue for discharging the flue gases. The soot and tar components deposit on the walls of the smoking chambers and on the sensing and heating means incorporated in said chambers so that they can no longer satisfactorily perform their function after some time. It has also been found that the apparatus for carrying out the known processes cannot be put into and out of operation as quickly as desired because the initiation of the combustion or heating of the sawdust takes considerable time and the combustion temperature varies continually. Owing to this fact, a constant quality of the smoking fluid as to the percentage composition of its components cannot be ensured.

Another disadvantage of the known processes resides in that the surplus gas or vapor which escapes from the boiling and/or smoking chamber is discharged through a relief valve so that there is an obnoxious smell and contamination of the surroundings of the smoking chamber, or flue connections are required.

It is an object of the invention to provide a simple process of producing a smoking fluid. More specifically, it is an object to provide a process of producing a smoking fluid which is free at least of most of the substances which are injurious to health, such as cancerogenic substances. It is another object to provide a process of the type set forth above which can be carried out independently of fixed connections, such as flue connections, and which permits of a storage of the produced smoking fluid.

It is desired to supply flavors or the like in a predetermined manner to the foodstuffs to be smoked. More specifically, it is desired to enable an exact predetermination of the intensity and concentration in which the flavors or the like are to be taken up by the foodstuffs.

It should be possible to smoke the foodstuffs within a short time. The surplus vapor escaping from the smoking chamber or a boiling cabinet or the like should be discharged in a simple manner so that the surplus vapor condenses quickly and can then be discarded, e.g., through a sewer system. An accurate control of the pressure in the smoking chamber should be possible and a reliable protection is required against a re-entrance of atmosphere from the sewer system.

It is another object of the invention to provide an apparatus for carrying out the process and for continuously or intermittently producing the smoking fluid in a uniform and predetermined or adjustable quality. The apparatus should be simple in structure and enable a direct use of the gaseous fluid after its production or a simple storage of the fluid.

In a process of producing a fluid for smoking foodstuffs such as meat, sausage, fish, ham, cheese and the like, in which process the foodstuff is subjected to the action of the smoking fluid produced from sawdust, superheated steam of at least 180° C., preferably 250° C. to 390° C. is used according to the invention for the thermal decomposition of sawdust. This has the advantage that the temperature at which flavors or the like are extracted from the sawdust can be exactly controlled so that only the desired substances are recovered from the sawdust. Owing to the use of water vapor, the sawdust cannot be inflamed so that the smoking chambers containing the foodstuffs to be smoked remain clean.

According to a further feature of the invention, the smoking fluid is saturated with moisture to about 100% at 70–100° C., preferably 80° C., so that the smoking fluid can condense on the foodstuffs to be smoked and a much faster and more intensive transfer of the substances contained in the smoking fluid and their uniform distribution on the surface of the foodstuffs is ensured.

According to a further proposal according to the invention, air or another neutral gas is admixed to the superheated steam before it passes through the sawdust in order to vary the moisture content and the flavor of the smoking fluid.

The steam which has been enriched with flavors, i.e., the smoking fluid, may have water vapor, air or another neutral gas admixed thereto before it contacts the foodstuffs so that the concentration, composition and intensity of action can be controlled. Depending on the amount and temperature of the neutral gas admixed to the smoking fluid, the latter will have a larger or smaller depth of penetration into the foodstuffs so that the taste and moisture content can be selectively changed.

The admixing of water vapor, air or another neutral gas is preferably effected before the liquefaction of the smoking fluid because this ensures a particularly good mixing.

A particularly fast and intense smoking of the foodstuffs will be enabled if the smoking fluid is transferred to the foodstuffs to be smoked by dewing or condensing.

This avoids an excessive loss of smoking fluid in a vapor state and ensures a uniform distribution of the smoking fluid on the foodstuffs.

If the smoking fluid is intermittently applied to the foodstuffs during periods of time which succeed in timed intervals, an optimum action of the smoking fluid on the foodstuffs to be smoked will be obtained. The foodstuffs are only slightly heated. This process can be carried out in a simple manner with the aid of a timer which controls the supply of the smoking fluid.

According to another proposal according to the invention, the surplus smoking fluid vapor escaping during the smoking of the foodstuffs is liquefied with water. For this purpose, the escaping fluid which is vaporus or entrained by a vapor is suitably passed into a vesel or the like which is filled with water and which communicates below the water level with an overflow. The water level and the water temperature in the vessel are sensed by a thermometer and are automatically controlled. This ensures a reliable condensation of the vaporous surplus fluid in a simple manner before said fluid is discharged. The selection of the water level at the overflow enables an exact determination of the pressure in the vessel and in the boiling cabinet connected to it.

In an advantageous development of the process according to the invention, the sawdust contained, e.g., in a hopper, is subjected to a continuous stream of the superheated stream passing therethrough, and the rate of the continuously flowing sawdust and of the superheated steam can be controlled. This ensures a constant quality of the resulting smoking fluid. The height of the stream of sawdust is preferably so large that the uppermost layer of the sawdust is not thermally decomposed by the superheated steam but acts as a filter layer for the smoking fluid evolved under this layer. This ensures a filtering of the smoking fluid and a removal of undesired substances therefrom so that the quality of the smoking fluid is improved.

Another important feature of the process according to the invention resides in that the vaporous smoking fluid is liquefied at temperatures above 0° C. The known processes enable a liquefaction of the smoking gas only at very low temperature. The gaseous smoking fluids must be cooled to at least −80° C., as a rule, for liquefaction. Another advantage will thus be obtained by the liquefaction of the vaporous smoking fluid at temperatures above 0° C. according to the invention, e.g., by an indirect cooling with water or air.

An apparatus for producing a fluid for smoking foodstuffs, such as meat, sausage, cheese or the like, with the aid of sawdust and superheated steam, is characterized according to the invention in that the apparatus comprises a feeder, which supplies the sawdust into the steam zone and automatically and continuously feeds fresh sawdust to the apparatus so that a constant quality of the resulting smoking fluid is ensured.

According to another feature of the invention, the feeder comprises a trough, which is disposed in the steam path and extends preferably transversely thereto. At the inlet end of said trough, a preferably funnel-shaped hopper for the sawdust is provided. This hopper is disposed outside the steam path and can be re-filled from time to time. From the hopper, the sawdust is continuously supplied to the steam.

In a further development of the invention, the trough is downwardly inclined from the hopper so that the velocity at which the sawdust flows in the trough can be predetermined in a simple manner. The angle of inclination of the trough and with it the velocity of flow of the sawdust is preferably adjustable, e.g., by adjusting the entire apparatus to a suitable inclination.

According to a further feature of the invention, the trough and/or the hopper are vibratably mounted and connected to a vibrator or the like. The vibration of the trough and of the hopper causes the sawdust to flow from the hopper into the trough. The vibration causes also a conveyance of the sawdust in the trough.

In another desirable embodiment of the invention, a motor-driven conveyor screw is provided at the inlet end of the trough and this screw is preferably disposed in a duct, which conforms to the outside diameter of the screw and which communicates with the outlet of the hopper for the sawdust and with the inlet of the trough. This enables a supply of sawdust at a metered rate from the hopper into the trough. The sawdust provides for a perfect seal between the hopper and the trough so that no steam can enter the hopper.

According to another feature of the invention, the hopper is succeeded in the direction of flow of the sawdust by an adjustable height limiter, e.g., in the form of a plate, which is urged onto the surface of the sawdust conveyed in the trough and enables an exact adjustment of the height of the sawdust layer which is being conveyed in the trough.

A container for collecting the exhausted sawdust is preferably provided under the output end of the conveyor trough, and the exhausted sawdust drops at the outlet end of the trough into the collecting container. This arrangement enables a substantially uninterrupted operation of the apparatus because the sawdust is continuously supplied to the trough and leaves the same when it has been consumed.

The cross-section of the trough is suitably open at the top and the trough is formed in its bottom with apertures for the discharge of the steam. Under the bottom apertures of the trough, a controllable superheater for the steam is suitably provided and a controlled steam supply conduit opens into this superheater. The superheater may be preceded by an evaporator, e.g., a continuous evaporator, so that it is sufficient to supply water to the apparatus, which water is first evaporated, then superheated and thereafter supplied to the sawdust through the bottom apertures of the trough.

According to another proposal according to the invention, the trough, the superheater and the container for collecting the exhausted sawdust are disposed in an insulated housing, which has at the top an opening for discharging the smoking fluid.

It is particularly advantageous if the conveyor trough has lateral apertures for the passage of the steam because the sawdust conveyed in the trough is then prevented from falling down from the trough and a particularly uniform contact between the sawdust and the water vapor is ensured.

The opening for discharging the smoking fluid from the insulated housing is preferably connected to a cooling device for cooling the smoking fluid through its boiling point because the smoking fluid can easily be stored and handled in a liquid state. The cooling device contains suitably a pipe coil for the smoking fluid, which coil extends in a coolant container, and the latter is provided with a thermometer for controlling a solenoid valve, which is incorporated in the coolant supply conduit. This enables an exact control of the coolant contained in the coolant container, such as water, at a constant temperature.

The invention will now be explained more fully with reference to illustrative embodiments shown in the accompanying drawings, in which FIG. 1 is a simplified sectional representation of an apparatus according to the invention, FIG. 2 is a view similar to FIG. 1 and shows another embodiment of the invention.

FIGS. 3 to 5 are simplified fragmentary views illustrating further embodiments of the invention and FIG. 6 shows a device according to the invention for cooling the smoking fluid.

Figure 8:
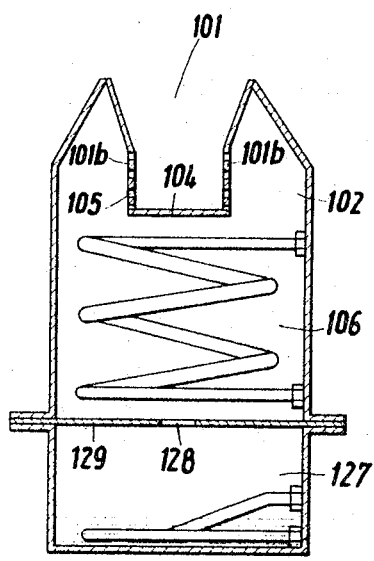

Two further embodiments of the conveyor trough are shown in FIGS. 7 and 8.

FIG. 7 is a simplified transverse sectional view showing an apparatus according to the invention, and FIG. 8 is a view similar to FIG. 7 and shows another embodiment of the invention.

As is shown in FIG. 1, an apparatus according to the invention for producing a smoking fluid comprises a conveyor trough 1, which communicates with a hopper 2 for the sawdust 3 and which further communicates through apertures 5 in the bottom 4 of the trough with a superheater 6. Preferably, the aperture 5 nearest the discharge end 14 of the trough 1 is positioned therefrom a distance greater than that of the vertical height of the sawdust 3. Such a placement of the aperture 5 with respect to the discharge end 14 insures that the entering steam will pass upwardly through the sawdust 3 since the pressure differential therebetween is less than that between the end 14 and the nearest aperture 5. The trough is accommodated in a housing 7, which has an outlet 8 for the smoking fluid.

The conveyor trough 1 communicates with the hopper 2 disposed outside the housing 7 and is connected by vibration-permitting mountings, e.g., in the form of spring elements 10, to the housing 7 or a control cabinet 9 associated with the apparatus. The trough 1 is mounted so as to be capable of vibration. A magnetic vibrator 11 is provided for producing the vibration. The velocity and rate of conveyance can be changed in a simple manner by adjusting the amplitude of vibration of this magnetic vibrator.

As is also shown in FIG. 1, that portion of the bottom 4 of the conveyor trough 1 which is provided with the apertures 5 is connected by a bellows 12 to the superheater 6. That end 14 of the conveyor trough 1 which is accommodated in the housing 7 is disposed over a container 15 for collecting the exhausted sawdust. The housing 7 is provided with insulation 13.

When sawdust 3 is contained in the hopper 2 disposed outside the housing 7 and the vibrator is in operation, the sawdust 3 is fed into the trough 1. The trough 1 is inclined toward its end 14 disposed in the housing 7 so that the sawdust 3 is conveyed by the vibration in the trough in the direction of the arrow 16 past the bottom apertures and finally falls into the container 15. Superheated steam flows from the superheater 6 through the bottom apertures 5 in the direction of arrow 17 into the trough 1 and contacts the sawdust in the trough. As a result of this contact, the steam extracts flavors and the like from the sawdust so that a smoking fluid is obtained, which can then be removed through the outlet 8 provided on the housing 7.

To enable an exact adjustment of the height of the layer of sawdust which moves in the trough 1, a gate 19 extends into the opening 18 which is formed in the hopper 2 and connects the same to the trough 1. This gate determines the height of the layer of sawdust. The hopper 2 is tightly sealed by a cover 20. Thus the steam and the smoking fluid cannot enter the hopper 2 nor escape through the same.

The superheater 6 comprises a heater 21, which is contained in a housing 22. A steam conduit 23 opens into the housing 22. A temperature sensing element 24 is provided behind the heater 21 in the direction of flow of the steam (arrow 17). The rate of the steam flowing into the superheater is exactly controlled by a solenoid valve, not shown, and a rate control valve 25. This steam is heated by the heater 21 to an adjustable temperature and is then passed in the direction of the arrow 17 to the sawdust 3 moving in the trough 1. The temperature sensing element 24 is connected to a temperature controller 26, which is disposed in the control cabinet 9 and controls the temperature of the heater 21. This enables a maintenance of a constant temperature of the steam which is supplied to the sawdust 3.

As is also shown in FIG. 1, an evaporator 27 is disposed under the superheater 6 and communicates with the superheater 6 through an opening 28 in an insulated partition 29. This evaporator 27 is required if no steam supply is available at the location of the apparatus. The continuous evaporator 27 comprises a heater 30. A water conduit 31 incorporating the rate control valve 25 opens into the continuous evaporator 27. An overflow pipe 32 extends into the continuous evaporator. The water entering through conduit 31 into the continuous evaporator 27 is evaporated by the heater 30 and is then passed through the opening 28 to the superheater 6. The water level in the continuous evaporator 27 is maintained constant by the overflow pipe 32.

The control cabinet 9 contains a horn 33 or a similar signalling device, which is controlled to a means for checking the level of the sawdust in the funnel-shaped hopper 2. A capacitive or photo-electric measuring method may be used to generate a signal when the sawdust level has dropped below a predetermined value and new sawdust must be charged.

In the embodiment of the invention shown in FIG. 2, a screw 35 is disposed in a duct 34, which connects the outlet of the funnel-shaped hopper 2a to the trough 1. The crest diameter of the conveyor screw 35 is about the same as the inside diameter of the duct 34.

The conveyor screw 35 is driven by an electric motor 37 and a change-speed transmission 36.

The height of the sawdust 3 in the conveyor trough 1 of FIG. 2 is determined by the plate 38, which is mounted on and adjustable by a screw 39 provided with a handwheel 40.

A particularly good seal between the hopper 2a and the conveyor trough 1 will be obtained if the pitch of the conveyor screw 35 decreases in the direction of conveyance (arrow 16) and/or its root diameter increases in the direction of conveyance (arrow 16) according to a cone. In this case, the sawdust will be forced against the surrounding wall of the duct 34 and will thus form a seal preventing steam losses. The rate at which sawdust is moved from the hopper 2a into the conveyor trough 1 can be exactly controlled by the speed of the conveyor screw 35.

A particularly desirable embodiment of the invention will be obtained if the conveyor trough 1 extends into the superheater 6, as is shown in FIG. 3. In this case, the side walls 1a of the conveyor trough are exposed to the steam which is produced in the superheater 6 so that the walls 1a are heated to the temperature of said steam. Owing to the comparatively high temperature of the side walls 1a of the conveyor trough 1, a condensation involving a deposition of exhausted sawdust on the walls of the conveyor trough 1 is avoided. By a natural, intensive scavenging with steam the trough is kept clean and does not require attention. A similar embodiment is shown in FIG. 5, where the conveyor trough 1 is not disposed over the heater 21 but laterally offset from the same to avoid a falling of sawdust particles into the superheater.

In the embodiment shown in FIG. 4, the side walls 1a of the conveyor trough 1 are disposed outside the superheater 6.

FIG. 6 shows an apparatus for cooling the vaporous smoking fluid below its boiling point. The cooling device 41 comprises a pipe coil 43 for the smoking fluid. This coil is disposed in the coolant container 42. A coolant supply conduit 44 incorporates a solenoid valve 45 and opens into the coolant container 42. An outlet 46 is provided in the upper portion of the coolant container 42. The temperature sensing element 47 of a temperature controller 48 for controlling the solenoid valve 45 extends into the coolant container 42. By the opening and closing of the solenoid valve, a temperature set at the temperature controller 48 is maintained constant. The pipe coil 43 may be connected, e.g., directly to the outlet 8 of the housing 7 of the apparatus described hereinbefore so that the smoking fluid is liquefied immediately after it has been made and can then be stored.

Instead of the conveyor trough 1 shown in the drawings and having a U-shaped cross-section, a conveyor trough may be used which has a closed rectangular, oval, cylindrical or similar cross-section, provided that it is formed with apertures for the discharge of the steam from the conveyor trough 1. Such apertures may be disposed opposite to the bottom apertures 5. Other means for conveying the sawdust may be provided, such as a revolving grate or the like.

Another aspect of the invention is concerned with the use of a smoking fluid produced according to the process and/or by the apparatus described hereinbefore for smoking foodstuffs such as meat, sausage, ham or the like. This process is characterized according to the invention in that the material to be smoked is steam cooked during the smoking treatment. Contrary to the known processes, in which the material to be smoked is first smoked and then boiled, the need for an additional boiling treatment is entirely eliminated because of the steam cooking. The liquid or gaseous state of the smoking fluid enables the foodstuff to be both smoke flavored and steam cooked simultaneously, thereby combining the smoking treatment and the boiling treatment so that substantial time is saved.

According to FIG. 7 an apparatus according to the invention comprises a conveyor trough 101, which is rectangular in cross-section and has side walls 101a disposed in a sealed chamber 102, which communicates with a steam superheater 106, which is disposed under the conveyor trough 101. Water is evaporated in a continuous evaporator 127, which is disposed under the superheater 106. The resulting steam is fed to the superheater 106 through an opening 128 in a partition 129.

The conveyor trough 101 has openings for the entrance of steam from the superheater 106 into the conveyor trough 101 only in the lower portion of the side walls 101a of the trough. The sawdust moving through the conveyor trough 101 is thus uniformly supplied with steam from both sides and is completely utilized.

The junctures 103 from the side wall 101a to the bottom 104 of the conveyor trough 101 are rounded so that a particularly low sliding friction of the sawdust flowing through the conveyor trough 101 is obtained.

In the embodiment shown in FIG. 8, the upper portions of the side walls 101b of the conveyor trough diverge upwardly and the apertures 105 for the entrance of the steam are formed only in the parallel lower portions of the conveyor trough 101.

When reference is made herein to sawdust or wood solids, it is to be understood that finely divided wood chips or other equivalent materials may be readily substituted and remain within the scope of the invention.

What is claimed is:

1. A process of producing a smoking fluid for smoking foodstuffs, which comprises contacting particulate wood solids with superheated steam at a temperature of at least 180° C. to effect a thermal decomposition of said wood solids without inflammation sufficient to produce an open flame and form said smoking fluid, withdrawing said smoking fluid from said wood solids and contacting said foodstuffs therewith.

2. A process as set forth in claim 1, in which said wood solids are contacted with superheated steam at a temperature of 250–390° C.

3. A process as set forth in claim 1, in which the temperature of said smoking fluid is lowered after being withdrawn from said wood solids to a point wherein said smoking fluid is saturated to a moisture content of approximately 100%.

4. A process as set forth in claim 3, in which the temperature of said smoking fluid is lowered to about 70–100° C.

5. A process as set forth in claim 1, which comprises admixing a gas to said superheated steam before contacting the same with said wood solids.

6. A process as set forth in claim 5, in which said gas is air.

7. A process as set forth in claim 1, in which said smoking fluid is removed as a vapor from said wood solids and a neutral gas is admixed to said smoking fluid.

8. A process as set forth in claim 7, in which said neutral gas is water vapor.

9. A process as set forth in claim 1, in which said smoking fluid is removed from said wood solids and air is subsequently admixed therewith.

10. A process as set forth in claim 1, in which said smoking fluid is liquified after being withdrawn from said wood solids.

11. A process as set forth in claim 10, in which said smoking fluid is liquified at a temperature above 0° C.

12. A process as set forth in claim 1, in which a continuous stream of said wood solids is contacted with said superheated steam.

13. A process as set forth in claim 12, in which said stream is supplied at a controlled rate.

14. A process as set forth in claim 1, in which said superheated steam is supplied to said wood solids at a controlled rate.

15. A process as set forth in claim 1, in which said superheated steam is supplied to said wood solids at a controlled temperature.

16. A process as set forth in claim 1 wherein only a portion of said particulate wood solids are thermally decomposed by the contacting thereof with said superheated steam, and said smoking fluid is guided through a portion of the remaining wood solids that were not thermally decomposed thereby causing a filtering of said smoking fluid.

17. A process according to claim 16 wherein said superheated steam is contacted with the bottom of the lower layer of said particulate wood solids and said smoking fluid is discharged and filtered through the upper layer of said wood solids.

18. A process according to claim 1, in which the temperature of said smoking fluid is lowered prior to contacting said foodstuffs, said temperature being lowered to a point which causes the deposit of liquid on said foodstuffs.

19. A process of smoking foodstuffs, which comprises contacting particulate wood solids with superheated steam at a temperature of at least 180° C. to effect a thermal decomposition of said wood solids without inflammation sufficient to produce an open flame and form said smoking fluid, withdrawing said smoking fluid from said wood solids, supplying said smoking fluid to said foodstuffs, withdrawing surplus smoking fluid spaced about said foodstuffs and liquifying said surplus.

20. A process of smoking foodstuffs, by means of a smoking fluid which comprises contacting particulate wood solids with superheated steam at a temperature of at least 180° C. to effect a thermal decomposition of said wood solids without inflammation sufficient to produce an open flame and form said smoking fluid, withdrawing said smoking fluid as a vapor from said wood solids, at least substantially saturating said vapor with moisture, and then contacting said foodstuffs with said at least substantially saturated vapor.

21. A process as set forth in claim 20, wherein said foodstuffs are contacted with said at least substantially saturated vapor until the atmosphere thereabout is established to be substantially saturated with liquid and said foodstuffs are thereby steam cooked.

22. Apparatus for producing a smoking fluid for smoking foodstuffs, which comprises means defining a steaming zone, a steam source for supplying superheated steam at a temperature of at least 180° C. to said steaming zone, and feeding means for feeding particulate wood solids to said steaming zone into contact with said steam whereby said superheated steam effects a thermal decomposition of said wood solids to form said smoking fluid.

23. Apparatus as set forth in claim 22, in which said means defining said steaming zone comprise a trough having an inlet end and said feeding means comprises a hopper connected to said inlet end, said trough having at least one inlet opening for said superheated steam and at least one outlet opening for said smoking fluid.

24. Apparatus as set forth in claim 23, in which said trough is mounted so as to permit of an adjustment of its inclination.

25. Apparatus as set forth in claim 23, in which said feeding means comprises a conveyor screw disposed between said hopper and said inlet end, and a driving means operable to drive said conveyor screw.

26. Apparatus as set forth in claim 25, which comprises a duct containing said conveyor screw and connecting said hopper to said inlet end and having an inside diameter corresponding substantially to the crest diameter of said screw.

27. Apparatus as set forth in claim 26, in which the pitch of said screw decreases in the direction from said hopper to said inlet end.

28. Apparatus as set forth in claim 26, in which the root diameter of said conveyor screw increases in the direction from said hopper to said inlet end.

29. Apparatus as set forth in claim 23, which comprises limiting means for limiting the height of the stream of said wood solids in said trough.

30. An apparatus according to claim 29, wherein said trough has the discharge end thereof spaced from the nearest steam inlet opening a distance greater than the vertical height of said stream of said wood solids being passed therethrough.

31. Apparatus as set forth in claim 23, in which said trough is at least partially open-topped and has a bottom formed with apertures through which said steam source communicates with the interior of said trough.

32. Apparatus as set forth in claim 23, in which said trough comprises side walls and a bottom wall, the outside surfaces of said side and bottom walls being directly exposed to said superheated steam and at least one of said walls having at least one inlet opening for said steam.

33. Apparatus as set forth in claim 23, in which said trough has lateral openings through which it communicates with said superheated steam.

34. Apparatus as set forth in claim 23, in which said trough has a side wall which is at least partially tapered upwardly and outwardly.

35. Apparatus as set forth in claim 23, which said trough has a bottom and side walls and rounded junctures from said bottom to said side walls.

36. Apparatus as set forth in claim 23, which comprises means for limiting the height of the stream of said wood solids in said trough to a value which is less than the length of said trough.

37. An apparatus according to claim 23, wherein said trough is an enclosed conduit and said wood solids are passed in a longitudinal direction therethrough, said superheated steam is introduced into the interior of said conduit transverse to the feeding direction of said wood solids, and said smoking fluid is withdrawn from the interior of said conduit transverse to said feeding direction of said wood solids.

38. An apparatus according to claim 37, wherein said smoking fluid is withdrawn from the interior of said conduit through at least one outlet opening, said outlet opening being located on the wall opposite that wherein said superheated steam is introduced.

39. Apparatus as set forth in claim 22, in which said steam source comprises a superheater disposed close to said trough, said superheater having means for controlling the temperature of said steam.

40. Apparatus as set forth in claim 39, which includes a steam supply means to supply steam to said superheater.

41. Apparatus as set forth in claim 39, in which said trough has a discharge end opposite to said inlet end and in which a container for collecting exhausted wood solids is disposed under said discharge end, and an insulated housing containing said trough, superheater and container and formed with an outlet opening for the smoking fluid.

42. Apparatus as set forth in claim 22 in which said steam source comprises a superheater and an evaporator prceding said superheater.

43. Apparatus as set forth in claim 22, in which said means defining a steaming zone comprises a trough which is downwardly inclined from said feeding means.

44. Apparatus as set forth in claim 22, which comprises means vibratably mounting said means defining a steaming zone and a vibrator operable to vibrate said means defining a steaming zone.

45. Apparatus as set forth in claim 22, which comprises means vibratably mounting said feeding means and a vibrator operable to vibrate said feeding means.

46. Apparatus as set forth in claim 22, in which said means defining a steaming zone are formed with an outlet and which comprises a cooling device arranged to receive said smoking fluid through said outlet from said steaming zone and adapted to cool said smoking fluid through its boiling point.

References Cited
UNITED STATES PATENTS

| | | | |
|---|---|---|---|
| 110,627 | 1/1871 | Bruce | 99—260 X |
| 1,290,421 | 1/1919 | Ullin | 99—229 X |
| 1,811,191 | 6/1931 | Taylor | 99—259 X |
| 1,960,516 | 5/1934 | Taylor | 99—229 |
| 2,464,614 | 3/1949 | Sala | 99—229 |
| 2,558,307 | 6/1951 | McMullen. | |
| 2,677,038 | 4/1954 | Reynoldson | 99—259 X |

HYMAN LORD, Primary Examiner

U.S. Cl. X.R.

99—259